July 14, 1931.  A. G. WAGNER  1,815,017
CLOTH CUTTING MACHINE
Filed May 17, 1928   4 Sheets-Sheet 3

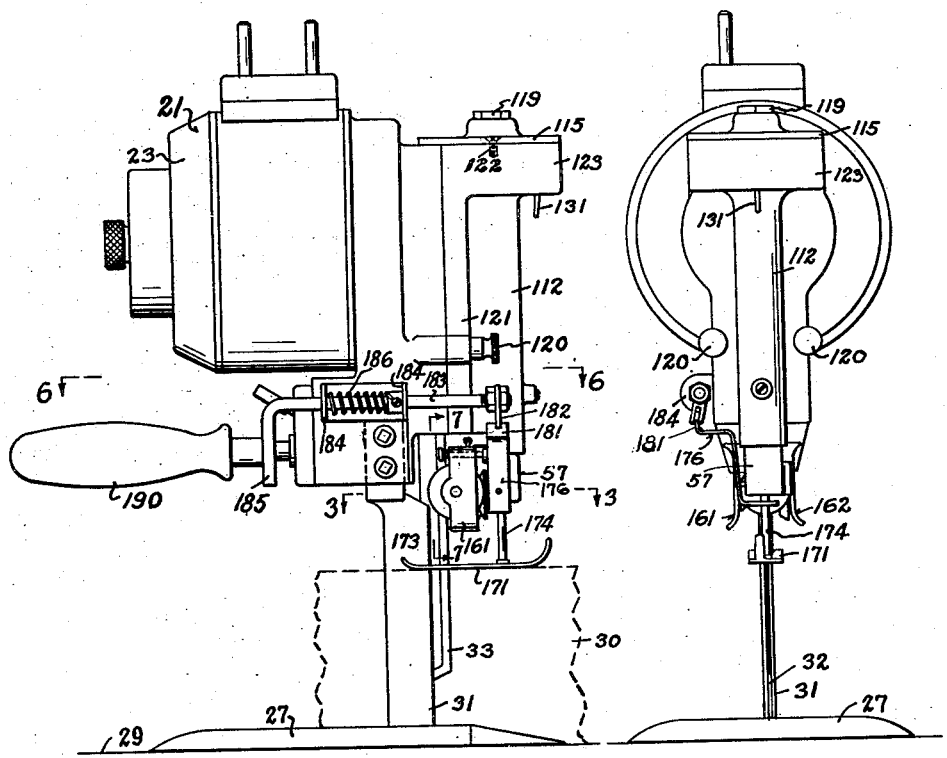

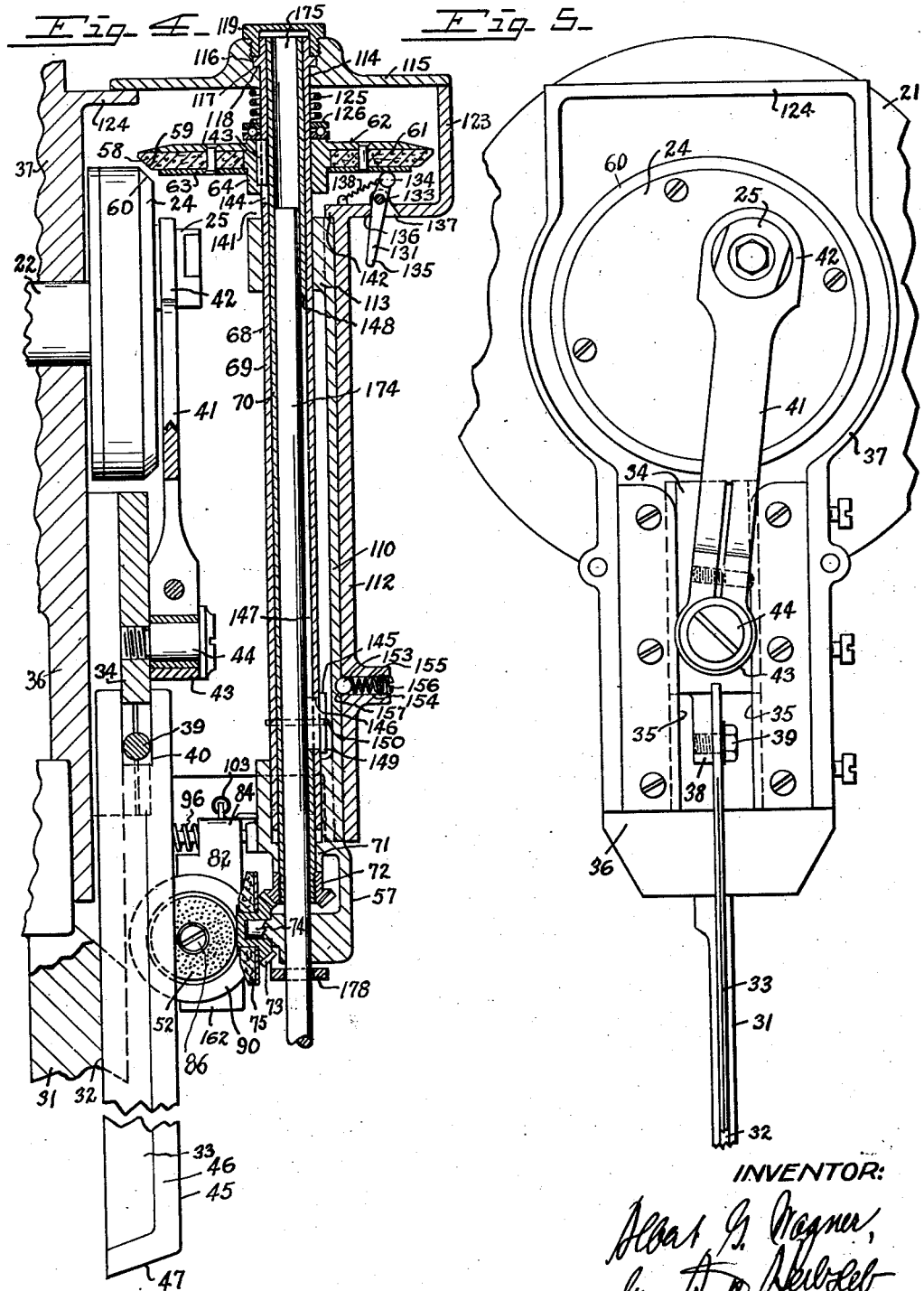

INVENTOR:

July 14, 1931. A. G. WAGNER 1,815,017
CLOTH CUTTING MACHINE
Filed May 17, 1928  4 Sheets-Sheet 4
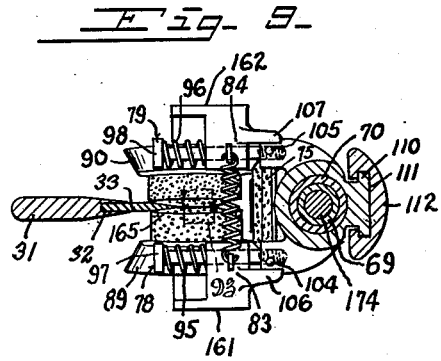
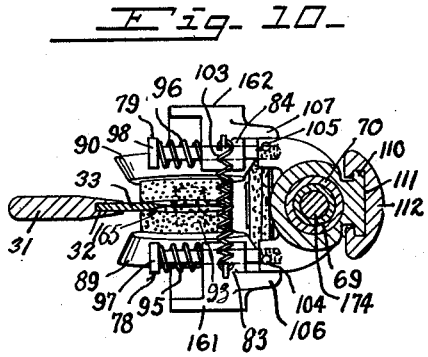
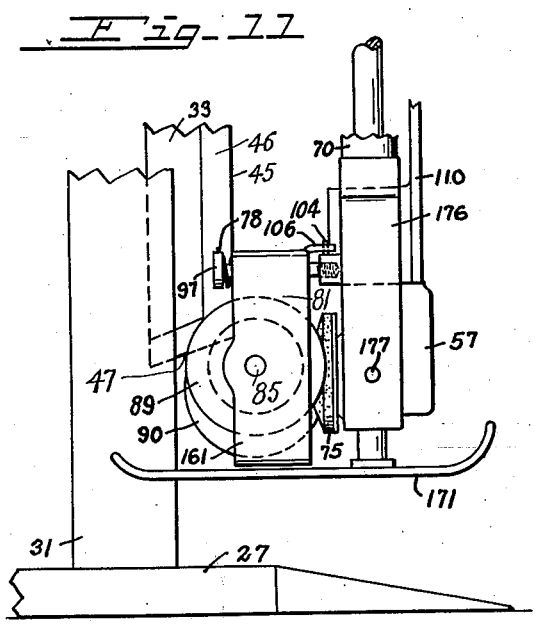
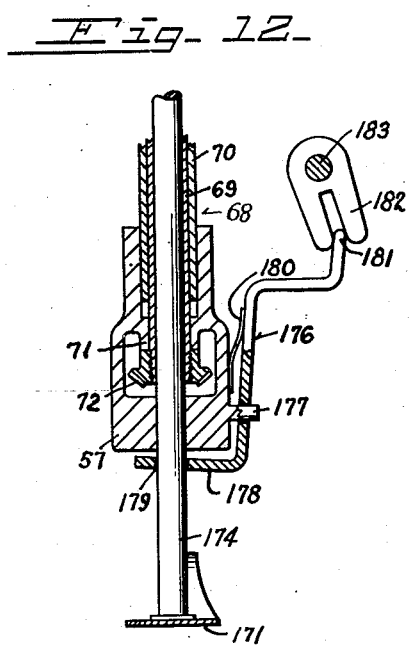
INVENTOR:

Patented July 14, 1931

1,815,017

UNITED STATES PATENT OFFICE

ALBERT G. WAGNER, OF COVINGTON, KENTUCKY, ASSIGNOR TO THE WOLF MACHINE COMPANY, OF CINCINNATI, OHIO, A CORPORATION OF OHIO

CLOTH CUTTING MACHINE

Application filed May 17, 1928. Serial No. 278,359.

My invention relates to cloth cutting machines, and principally to means for sharpening knives in the same, particularly in such machines as employ a reciprocating knife.

It is the object of my invention to provide new and improved means for supporting the grinding means; further, to provide new and improved means for mounting the grinder or grinders in order that the same may be moved toward and from the knife; further, to provide new and improved means for supporting the grinder or grinders in order that knives which have become worn to greater or less extent may be contacted by the grinder or grinders in order to sharpen the same; further, to provide novel means for driving the grinding means; and, further, to provide grinders at the respective sides of the knife in such manner that the operator may move the same relatively to each other and for coaction with the knife at the respective sides of the knife in order that the knife may be subjected to selected pressures between the grinders for sharpening the knife without undue wear upon the knife in the sharpening operation.

It is the object of my invention, further, to provide novel means for guiding the grinding means in the direction of length of the knife; further, to provide novel means whereby the grinding means may be moved in the direction of length of the knife for sharpening the lengthwise edge of the knife and positioned for endwise contact by the knife for sharpening the end edge of the knife; further, to provide novel means for positioning the grinders in inactive relation at the top of the path of the reciprocating knife; further, to provide novel extensible driving connection between a rotating part of the cutting mechanism and the rotating grinding means; further, to provide novel means for connecting and disconnecting the motive power of the machine with relation to the grinding means; further, to provide novel means for supporting the presser-foot in a device of this character; and, further, to provide novel means for rotating the grinding means having an axis of rotation coincident with the axis of the stem of the presser-foot.

The invention will be further readily understood from the following description and claims, and from the drawings, in which latter:

Fig. 1 is a side elevation of my improved device.

Fig. 2 is a front elevation of the same.

Fig. 3 is a plan section of the same, taken on the line 3—3 of Fig. 1, partly broken away.

Fig. 4 is a vertical axial section of my improved device, taken in the plane of the line 4—4 of Fig. 3, and partly broken away.

Fig. 5 is a front elevation of my improved device with the grinding mechanism removed for better illustration of the means for reciprocating the knife, and partly broken away.

Fig. 9 is a cross-section of the same, taken in the plane of the line 9—9 of Fig. 8, and showing the relation of the grinders and knife when the knife is substantially new.

Fig. 10 is a similar view, showing the relation of the grinders and knife when the knife has become worn.

Fig. 11 is a side elevation of a detail of my improved device, showing the grinding means in position for sharpening the lower end cutting edge of the knife; and, Fig. 12 is a vertical section of a detail of the clamping means for the stem of the presser-foot, taken in the plane of the line 12—12 of Fig. 3.

Figure 7:
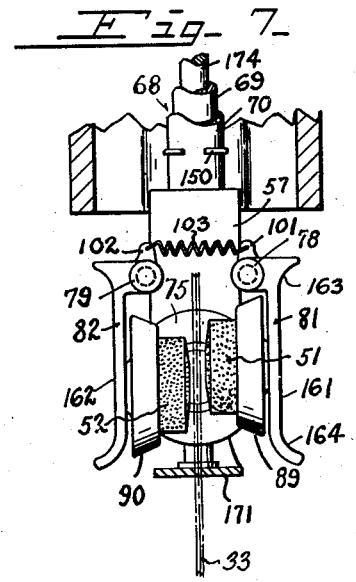
Fig. 7 is an inside elevation, partly in section, taken on the line 7—7 of Fig. 1, showing the relation of the grinders distanced from the plane of the knife.

The cloth cutting machine exemplified comprises an electric motor 21, having a rotor provided with an axle 22, journaled in suitable bearings in the motor casing 23, and having a crank-wheel 24 fixed thereto provided with a crank-pin 25. A usual base 27 is arranged to travel on a usual table surface 29 on which the layers of cloth are laid or piled, such pile of layers of cloth being indicated at 30.

Figure 6:
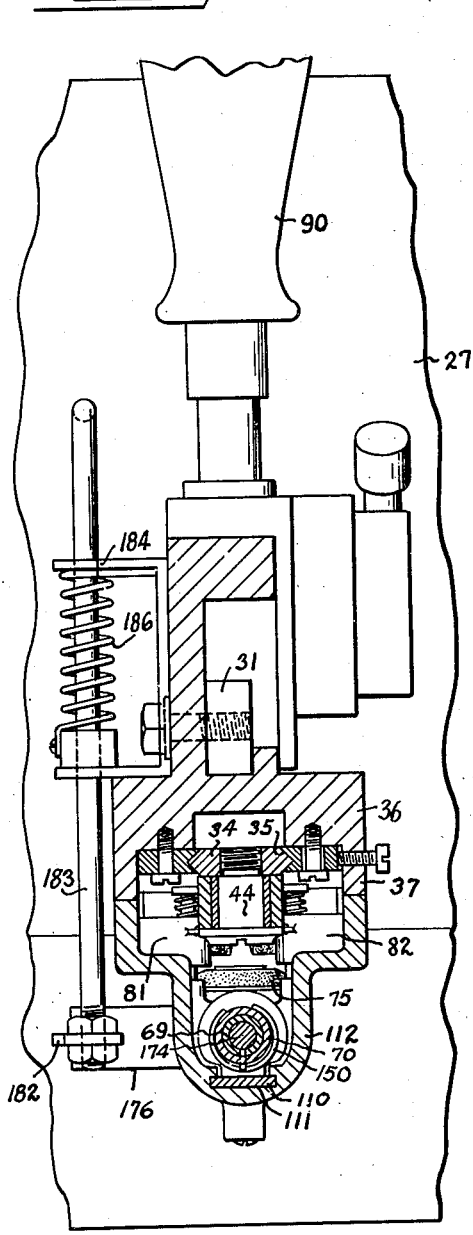
Fig. 6 is a cross-section of my improved device, taken on the line 6—6 of Fig. 1.

A usual standard 31 extends upwardly from the traveling base, the motor casing being mounted in suitable manner at the upper end of the standard. The standard is provided with a groove 32 in which the knife 33 is arranged to reciprocate. (Figs. 3, 9 and 10). The knife is suitably secured at its upper end to a cross-head 34, which reciprocates up and down in guideways 35 on an apron 36, which may be part of a suitable housing 37 on one of the ends of the motor casing. (Figs. 4, 5 and 6). These guideways are adjustable in suitable manner.

The connection between the cross-head and the reciprocating knife may be made by providing the cross-head with a lug 38, in which a clamping screw 39 is threaded, the clamping screw being received in a slot 40 in the upper end of the knife, for releasably attaching the knife to the cross-head. (Figs. 4 and 5). A connecting arm 41 has a bearing 42 about the crank-pin and a bearing 43 about a pin 44 suitably secured to the cross-head.

The knife 33, as usually constructed, has a front lengthwise cutting edge 45, from which bevel faces 46 extend rearwardly, and an end cutting edge 47 at its bottom, preferably also having similar bevel faces extending upwardly therefrom. (Figs. 4 and 11).

It has in practice been found difficult to keep the cutting edge of a knife of this character sharp, and while a number of machines for accomplishing this purpose have been devised and a number have been patented, it is still the general practice to employ an ordinary honing stick manually upon the knife in the machine for sharpening the knife. I have devised novel knife sharpening means for a machine of this character, which are mounted and retained on the machine, and are arranged to sharpen the knife while in the machine, and preferably while the knife is reciprocating, and I have provided such means of compact arrangement, so that full view of the goods being cut and of the coaction between the cutting knife and the goods is retained by the operator, so that the operator may readily follow the marked lines on the pile of goods for cutting the pattern, and may, when the knife becomes dull, readily sharpen the same with little consumption of time, and proceed with the cutting operation.

In the present exemplification I provide grinding means which comprise a pair of grinding wheels 51, 52, which have end grinding faces 53, 54, which are shown slightly conical, and are complemental to the side slanting faces of the cutting edge of the knife. (Figs. 3, 7, 9, 10 and 11.) These grinding faces are arranged to coact with the knife, either separately or combinedly, the grinding faces being preferably received at the respective sides of the knife in the grinding operation, so that the respective grinding faces support the knife laterally between them in such manner that each of the grinding faces holds the knife toward the other grinding face, for proper grinding coaction between the grinders and the knife.

This is done for the purpose of steadying the knife when grinding, as it has been found in practice that the walls of the groove 32 in the standard become worn in time, enlarging the groove so that the knife has lateral play in the groove.

The grinding means are mounted on a head 57, which is arranged to be moved in the direction of length of the knife. The rotary grinders are rotated from a rotative element of the cutting machine, exemplified as the crank-wheel 24, with which a friction wheel 58 coacts. (Figs. 4 and 5). The friction wheel and the crank-wheel have complemental contact driving faces 59, 60, for rotating the friction wheel. These friction-faces are shown conical.

The friction wheel has a friction disk 61 fixed between supporting plates 62, 63, one of which extends integrally from a hub 64.

A shaft 68 is driven by the friction wheel 58, and comprises telescoping sections 69, 70, which are rotatively connected. (Figs. 3, 4, 7 and 12). The section 70 is journaled in a bearing 71 in the head 57 and has a bevel-pinion 72 fixed thereto, this section moving lengthwise with the head. The bevel-pinion 72 meshes with a bevel-pinion 73 rotatable about a stud 74 fixed in the head. A friction wheel 75 rotates with the bevel pinion 73. This is shown as a face friction disk whose friction face is preferably slightly conical.

Brackets 78, 79, extend rearwardly from the head 57. Arms 81, 82, depend from the brackets, as by having bearings 83, 84, about the brackets. (Figs. 3, 4, 7, 8, 11.) The respective arms are provided with studs 85, 86, which form journals upon which the rotary grinders 51, 52, rotate. These grinders are shown received in sockets 87, 88, in friction wheels 89, 90, driven by the friction wheel 75. The friction wheels 89, 90, are shown provided with peripheral friction faces which coact with the friction face of the friction disk 75 for being rotated by the latter and thereby rotating the grinders. These peripheral friction faces are preferably slightly conical. The grinders are preferably held endwise on the arms so as to move with the arms, as by providing the studs 85, 86, in the form of shoulder screws, which are threaded into the arms, as shown at 91 and are provided with heads 92 received in bores 93 in the inner ends of the grinding wheels. The studs are received in bearings 94 on the driven friction wheels, the friction wheels rotating on these studs.

The driven friction wheels 89, 90, are preferably pressed toward the drive friction wheel 75. For accomplishing this the bearings 83, 84, have axial movements on the brackets, which form journals for the arms. (Figs. 9 and 10.) Springs 95, 96, are received about the brackets, between shoulders 97, 98, on said brackets at one of the ends of the springs and said bearings, the other ends of the springs pressing the arms and the driven friction wheels thereon toward the drive friction wheel.

The grinders are preferably normally held away from the knife, (Figs. 3, 7, 9 and 10), as by providing the arms with lugs 101, 102, to which the respective ends of a spring 103 are secured, the spring pressing said lugs toward each other. Pins 104, 105, fast in the brackets coact with lugs 106, 107, on the bearings 83, 84, the pins and lugs serving as stops to limit separating movements between the driven friction wheels and for maintaining the driven friction wheels in coactive relation on the drive friction wheel.

The head 57 has a slide 110 extending therefrom in the direction of length of the knife. (Figs. 4, 9 and 10.) This slide is movable endwise in a guideway 111 on a front cover 112, received outside the crank means, pitman and cross-head. The drive-shaft and guiding means for the slide are shown at the inside of this cover.

The upper end of the slide is provided with a bearing 113 about the section 69 of the telescoping shaft. (Fig. 4.) This latter section of the telescoping shaft is held endwise stationary. Its upper end is journaled in a bearing 114 in a top cover 115, and is held endwise in said bearing, as by providing it with an annular shoulder 116 rotating in an annular groove 117 in the bearing 114. One of the walls of this annular groove is formed by a bottom wall of a recess 118, and the other end wall thereof is formed by the lower end of a plug 119 having threaded connection with the wall of the recess.

The front cover is releasably secured to the apron 36, as by means of knurl-headed screws 120 received through holes in flanges 121 of the cover and threaded into the apron. (Figs. 1, 2 and 4.) The top cover is releasably secured to the front cover, as by means of screws 122 received through holes in the top cover and threaded into the walls of the bulge 123 of the front cover, in which bulge the drive friction wheel 58 for the grinding means is received. The inner margin of the top cover is received over a flange 124 of the housing 37.

Means are provided for releasing drive connection for the grinders when in idle relation, exemplified by providing the drive friction wheel 58 with an axial movement toward and away from the crank wheel 24. A spring 125 received about the drive shaft and located between the top cover and an end thrust ball bearing 126, normally urges the drive friction wheel 58 into engagement with the driving face therefor on the crank wheel. A lever 131 is received through the bottom wall 132 of the bulge of the front cover, and is pivoted on a pin 133 therein. It has a contact knob 134 arranged to move the drive friction wheel 58 endwise away from its complemental drive face on the crank-wheel. The outer end of the lever is provided with a finger-part 135, pressure upon which by the finger of the operator readily manually moves the lever. (Fig. 4.)

When the lever is moved for release of the drive friction wheel it swings into canted relation, with the contact-point of its contact-knob past a line intersecting the pivot of the lever and extending parallel with the direction of axial movement of the drive friction wheel, and is held in such canted position by the end wall 136 of the slot 137 through which the lever extends. A spring 138 normally holds the lever in retracted position.

The downward axial movement of the drive friction wheel 58 is limited by its contact with the coacting face on the crank-wheel. (Fig. 4). There is a space 141 between the lower end of the hub of the drive friction wheel and the upper bearing 113 on the slide 110 when the slide is in its uppermost position. This uppermost position of the slide may be limited by a limiting lug 142 on the front cover.

A key 143 in the drive friction wheel is received in an elongated slot 144 in the stationary section 69 of the telescoping shaft, such connection permitting sufficient endwise movement of said drive friction wheel for operative and inoperative relations of the same. (Fig. 4). A spline-key 145 is held in a slot 146 in the end section 69 of the telescoping shaft. This key is received in a spline groove 147 in the inner section of the telescoping shaft. This groove extends throughout a large portion of the length of the movable section of the telescoping shaft, for permitting movements of the grinders in the direction of length of the knife for grinding the lengthwise edge of the knife throughout its effective cutting length. The spline groove 147 preferably terminates with a shoulder 148, which coacts with the key 143 when the section 70 of the telescoping shaft is in its farthest down position, which relation of parts locates the grinders in proper relation for coacting with the lower end cutting edge of the knife.

This position is exemplified as a position in which the middle portions of the grinders are below the position of the lower end cutting edge when this edge is at its upper limit of reciprocation, (Fig. 11), so that, upon the down stroke of the knife, this end cutting edge coacts with the grinders for being ground thereby. This position is preferably such that the axes of rotation of the grinders, when in normally separated relation from the knife, are below the end cutting edge when the latter is at its upper limit of reciprocation.

The key 145 is preferably held in its slot in the outer member of the telescoping shaft, as by providing the same with end lugs 149 which coact with the outer face of said telescoping section and prevent inward movement or tilting of the key to undesirable extent. (Figs. 4 and 7). A spring-clip 150 is preferably received about the outer edge of the key and the outer section of the telescoping shaft. This holds the key in inward and in outward direction.

The grinder-slide is preferably held normally in up-position, which is its position when idle. (Fig. 4). This may be done by automatic means, as by a ball 153 in a bore 154 in the front cover 112 and spring-pressed by a spring 155 in said bore toward the slide, a plug 156 threaded in the outer end of said bore resisting the spring. The ball may be held in said bore by having the inner end of the wall of the bore swaged about the inner portion of the ball. The ball is received in a hole 157 in the slide, so positioned that the ball is received in said hole when the slide has been moved into up-position, the ball normally holding the slide in up-position. The operator may, however, readily manually force the slide downwardly by pushing or pulling downwardly on the grinder frame and thereby pressing the ball out of the hole in the grinder frame, for movement of the grinder frame in the direction of length of the knife.

The grinder arms are provided with finger contacts 161, 162, preferably having upwardly outwardly flaring portions 163 and downwardly outwardly flaring portions 164, for readily receiving the fingers of the operator, for instance, the fore finger and thumb, in grasping the grinding device for movement of the grinders in the direction of length of the knife or selectively toward the knife. (Figs. 7, 8, 9 and 10).

Figure 8:
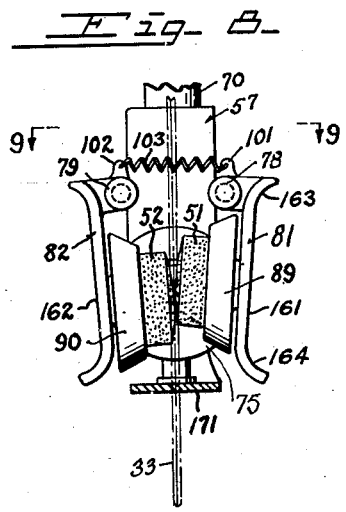
Fig. 8 is a similar view showing the grinders in a position of active relation with the knife for grinding the longitudinal edge of the knife.

The grinders are also preferably so mounted as to move in arcs which intersect the plane of the knife, and are also preferably so mounted as to avoid interference between the grinders. This latter may be accomplished by mounting the grinders at different distances from their respective pivotal axes, so that the arcs in which the respective grinders move intersect the plane of the knife at different points lengthwise of the knife. (Figs. 7 and 8). The grinders are permitted to move into each others' planes in the direction of the plane of the knife. The grinding faces, when said faces are moved toward each other, form a converging throat 165, (Figs. 9 and 10), the walls of which coact with the slanting side faces of the knife at the cutting edge. When the knife is new and of full width, the bottom of this throat is approximately in the vertical plane transverse to the knife in which the proximate portions of the walls of the bores 93 in the grinders are located when the grinders contact the knife. That is to say, the grinders are moved toward each other to such extent only when the knife is new and of full width, as to form the throat, with the bottom of the throat distanced to fullest extent from the standard. (Fig. 9). As the knife wears, and its cutting edge recedes, the grinders are swung farther toward each other, (Fig. 10), by pressure of the fingers of the operator upon the arms on which they are mounted, so as to shorten this throat and cause approach of the bottom of this throat toward the knife and standard, so that proper grinding relation between the grinders and the knife, according to the state of wear of the knife, may be always obtained by the operator.

The movement of the driven friction wheels toward each other also causes climbing movement of the driven friction wheels upon the drive friction wheel, in the direction of the plane of the knife, toward the knife, when conical friction wheels are employed, so that, as the knife is worn, the grinders are caused to move toward the knife for readily reaching the receded position of the cutting edge of the knife. This movement is also useful when grinding the lower end cutting edge of the knife.

The operator, in manipulating the positions of the grinders, can readily feel upon his fingers manipulating the arms when contact between the respective grinders and the knife is made, and senses or feels the fact of contact, and may readily regulate the pressure of contact by regulating the finger manipulation of the arms, so that just sufficient pressure is had between the grinders and the knife to effect the grinding, but to avoid undue wearing away of the knife.

In the exemplification shown, the pressure of the fingers of the operator causes contact between the grinders and the knife and the spring means normally retract the grinders from the knife, but it can be readily understood that this relation may be reversed without departing from my invention as stated in the accompanying claims.

A presser-foot 171 is provided for bearing upon the pile of goods during the cutting operation, (Figs. 1, 2, 3, 11 and 12), the presser-foot being provided with a usual slot 172 for accommodating the knife and standard and forming side toes 173 at the respective sides of the standard which coact with the standard for preventing rotation of the presser-foot. The presser-foot is provided with a stem 174, exemplified as received in the bore 175 of the drive-shaft for the grinding means. This presser-foot stem is slidable lengthwise in said shaft, the longitudinal axis of the presser-foot stem and the axis of rotation of the shaft being exemplified as coincident.

Means are exemplified for holding the presser-foot stem for holding the presser-foot in adjacency to the grinding means, when performing the grinding operation, or holding the presser-foot at selective points lengthwise of the standard according to the thickness of the pile of goods being operated on when performing the cutting. (Figs. 1, 2, 3, 6, 11, 12). Thus 176 is a clamp, shown in the form of an arm, and pivoted to the head 57, as by a pivot-pin 177, and having a portion 178 in which there is a hole 179, through which the presser-foot stem extends, the wall of the hole clamping upon the presser-foot stem when the portion 178 is tilted, and releasing the presser-foot stem for endwise movement of the latter, when the wall of the hole is in line with the stem. A spring 180 normally exerts pressure on the arm for clamping the presser-foot stem in place.

The arm is provided with a lug 181, in which a fork 182 is received. (Figs. 1, 2, 6, 12). The fork is fixed to a rock-shaft 183, journaled in bearing-lugs 184 on the frame of the machine, and provided with a finger-part 185. A spring 186 normally urges rocking of the rock-shaft for moving the clamp 176 into clamping position for holding the presser-foot. The connection, exemplified as the lug 181 and fork 182, between the clamping-arm and the control fork is preferably releasable, being automatically released when the grinder-head is moved out of normal position, so that the stem of the presser-foot is automatically locked to the grinder-frame when the grinder-frame is positioned for grinding. The presser-foot is in practice moved to position of closest approach with the grinder-frame before such release is effected.

A handle 190 is fixed to the machine frame for guiding and manipulating the movements of the frame during the cutting operation.

The cutting machine is employed and manipulated in usual manner during the cutting operations. If it is desired to sharpen the knife, the cutting machine is preferably moved away from the cloth, the presser-foot 171 is raised into adjacency with the grinding means, the finger-trip 131 is moved to release the friction drive wheel 58 for contact of the latter with the crank-wheel, thereby causing the grinders to rotate, and the grinder frame is moved downwardly, by the operator gripping the finger-pieces 161, 162, and pushing or pulling downwardly upon the same, the operator also pushes inwardly upon said finger-pieces for contact of the grinders with the bevel face of the cutting edge of the knife. The operator can readily feel the degree of pressure by the grinders upon the knife, by the reaction of the grinding action on the finger-pieces, so that the operator can regulate this pressure so as to avoid excess grinding of the knife.

The operator in the present exemplification, by finger pressure upon the arms which support the grinders, moves the grinders toward each other for contact of the grinders with the knife, and moves the grinder frame in the direction of length of the knife, preferably while the knife is reciprocating, for causing grinding of the lengthwise edge of the knife throughout the extent of the cutting portion thereof. This lengthwise edge may be ground, for instance, by passing the grinders up and down lengthwise of the knife one or more times, dependent on the condition of the cutting edge and the cutting edge desired.

The grinders, when in lowermost position, coact with the lower end cutting edge of the knife for grinding the latter rearwardly to sufficient extent for proper cutting by the knife.

When the grinding operation has been performed, the grinding frame is pushed upwardly for coaction of the holding means, exemplified as the ball 153 and its hole 157, the releasable connection, exemplified by the lug 181 and the fork 182, being also connected, for again connecting the clamping means for the stem of the presser-foot with the manual control part 185 therefor, so that the presser-foot may be raised or lowered and clamped in adjusted position for the cutting operation.

The grinding means and driving means for the same are in the present exemplification mounted upon the cover for the crank-wheel, cross-head and connecting arm. Removal of the cover exposes all of these parts for ready attention and care. All of these parts are further, in the present exemplification, removed from sight and placed in unobstructing relation, so that the same may not interfere with the view of the operator in following the lines of the desired cutting in the cutting operation.

The grinders are furthermore protected from contact therewith by the operator, by the grinder-head and the control arms and manipulating means for the latter, and the manner in which the driving mechanism is mounted in the head, so as to form shielding means for the grinding means and the driving means for the latter, and avoid danger or contact therewith by the operator or the goods.

My improved device is compact and simple, it is economical in construction, and its parts are readily repaired or replaced.

It is obvious that changes may be readily made in various parts of the device without, however, departing from the spirit of my invention, as stated in the accompanying claims.

Having thus fully described my invention, what I claim as new, and desire to secure by Letters Patent, is:

1. In a cloth cutting machine, the combination with a reciprocating knife having a cutting edge and a bevel-face at said cutting edge, and means automatically reciprocating said knife, of a rotary grinder for said knife, means rotating said grinder independent of contact with said knife, said rotary grinder having an axis of rotation extending at substantially right angles to the plane of said knife and provided with an end grinding face, means mounting said grinder with relation to said bevel-face, and resilient means for said grinder normally moving said grinder with relation to said bevel-face.

2. In a cloth cutting machine, the combination with a reciprocating knife having a cutting edge and a bevel-face at said cutting edge, and means automatically reciprocating said knife, of a rotary grinder for said knife, means rotating said grinder independent of its contact with said knife, said rotary grinder having an axis of rotation extending at substantially right angles to the plane of said knife and provided with an end grinding face, means mounting said grinder with relation to said bevel-face, resilient means for said grinder normally moving said grinder with realtion to said bevel-face, and a manual control-part on said means mounting said grinder for manual movement of said grinder to overcome the resistance of said resilient means.

3. In a cloth cutting machine, the combination with a reciprocating knife, of a grinder support, rotary grinding means on said support, an extensible shaft extending in the direction of length of said knife upwardly from said grinder support for rotating said grinding means, and guiding means for movement of said grinding means in the direction of length of said knife having the axis of rotation of said extensible shaft as its center.

4. In a cloth cutting machine, the combination with a reciprocating knife, of rotary grinding means, a shaft extending in the direction of length of said knife for rotating said grinding means, a presser-foot, and a stem for said presser-foot extending in the direction of length of said knife and having a longitudinal axis coincident with the axis of rotation of said shaft.

5. In a cloth cutting machine, the combination with a reciprocating knife, of rotary grinding means, a shaft extending in the direction of length of said knife for rotating said grinding means, a presser-foot, a stem for said presser-foot extending in the direction of length of said knife and having a longitudinal axis coincident with the axis of rotation of said shaft, and guiding means for movement of said grinding means in the direction of length of said knife.

6. In a cloth cutting machine, the combination with a reciprocating knife, of rotary grinding means, a shaft extending in the direction of length of said knife for rotating said grinding means, a presser-foot, a stem for said presser-foot extending in the direction of length of said knife and having a longitudinal axis coincident with the axis of rotation of said shaft, and guiding means for movement of said grinding means in the direction of length of said knife, said guiding means including a guiding part having the axis of rotation of said shaft as its center.

7. In a cloth cutting machine, the combination with a reciprocating knife, of rotary grinding means, a shaft extending in the direction of length of said knife for rotating said grinding means, a presser-foot, a stem for said presser-foot extending in the direction of length of said knife and having a longitudinal axis coincident with the axis of rotation of said shaft, means for reciprocating said knife comprising a rotary element, and releasable connecting means between the latter and said shaft for rotating said shaft.

8. In a cloth cutting machine, the combination with a reciprocating knife, of rotary grinding means, a shaft extending lengthwise of said knife, a presser-foot, a stem for said presser-foot telescopingly arranged with said shaft, and gearing for rotating said grinding means comprising a gear on said shaft rotatable about said stem of said presser-foot.

9. In a cloth cutting machine, the combination with a reciprocating knife, of rotary grinding means, a telescoping shaft extending in the direction of length of said knife, said telescoping shaft comprising rotatively connected sections, a rotary driving element for said shaft, and a rotary driving element between said shaft and said grinding means, said rotary driving elements having operative connections with said respective sections.

10. In a cloth cutting machine, the combination with a reciprocating knife, of rotary grinding means, telescoping driving means extending in the direction of length of said knife and comprising rotatively connected sections, releasable driving means for one of said sections, and rotatable driving means for said rotary grinding means mounted on the other of said sections.

11. In a cloth cutting machine, the combination with a reciprocating knife, of rotary grinding means, rotatable telescoping means extending in the direction of length of said knife and comprising rotatively connected sections, releasable driving means for one of said sections, and rotatable driving means for said rotary grinding means mounted on the other of said sections, said rotary grinding means arranged for being manually moved by telescoping movement between said sections.

12. In a cloth cutting machine, the combination with a reciprocating knife, of a grinder support, rotary grinding means mounted thereon, a shaft extending in the direction of length of said knife for rotating said grinding means, a rotary driving element for rotating said shaft, said shaft comprising telescoping sections, one of said sections extending upwardly from said grinder support, and the other of said sections extending downwardly from said driving element.

13. In a cloth cutting machine, the combination with a reciprocating knife, of a grinder support, rotary grinding means mounted thereon, a shaft extending in the direction of length of said knife for rotating said grinding means, and a rotary driving element for rotating said shaft, said shaft comprising telescoping sections, one of said sections extending upwardly from said grinder support, the other of said sections extending downwardly from said driving element, and said grinder support arranged for manual movement in the direction of length of said knife whereby to cause telescoping movements between said sections of said telescoping shaft.

14. In a cloth cutting machine, the combination with a reciprocating knife, of a grinder support, rotary grinders on said support at the respective sides of said knife, means for guiding said support in the direction of length of said knife, a shaft extending in the direction of length of said knife for rotating said grinders, and a releasable driving element for said shaft, said grinder support provided with manual gripping means wherewith to move said grinder support on said guiding means in the direction of length of said knife.

15. In a cloth cutting machine, the combination with a reciprocating knife, of a grinder support, rotary grinders on said support at the respective sides of said knife, means for guiding said support in the direction of length of said knife, said rotary grinders mounted for relative lateral movement with relation to said knife, and manual gripping means on said support whereby to manually move said rotary grinders in lateral directions with relation to said knife and to move said grinder support on said guiding means in the direction of length of said knife.

16. In a cloth cutting machine, the combination with a reciprocating knife, of a grinder frame, arms pivoted thereto at the respective sides of said knife, rotary grinders on said respective arms at the respective sides of said knife, a friction wheel on said frame, friction wheels coacting therewith respectively rotatively connected with said respective rotary grinders, and spring means urging contact between said friction wheels and arranged for normally moving said rotary grinders laterally outwardly, said arms provided with gripping means for manually moving said arms toward said reciprocating knife and for moving said grinder frame in the direction of length of said knife.

17. In a cloth cutting machine, the combination with a reciprocating knife, of a grinder frame, arms at the respective sides of said reciprocating knife pivoted to said grinder frame, rotary grinders at the respective sides of said knife on said arms, means for guiding said grinder frame in the direction of length of said knife, friction wheels rotatively connected with said rotary grinders, and a drive friction wheel coacting with the latter, the pivotal axes of said arms located on said grinder frame being at the respective sides of said reciprocating knife for moving said grinders in arcuate paths which intersect the plane of said knife, and said grinder frame arranged for movement in the direction of length of said knife.

18. In a cloth cutting machine, the combination with a reciprocating knife, of a grinder frame, means for guiding said grinder frame in the direction of length of said knife, arms pivoted to said grinder frame at the respective sides of said knife, rotary grinders on said arms at the respective sides of said knife having axes of rotation transverse to the plane of said knife, friction wheels on said respective arms for rotating said grinders, a drive friction wheel therefor, the pivotal axes of said arms being spaced from said knife for movements of said grinders in arcuate paths intersecting the path of said knife and for movements of said first-named friction wheels in arcuate paths crosswise along the face of said drive friction wheel, and means for manual movement of said arms on their pivots and for manual movement of said grinder frame in the direction of length of said knife.

19. In a cloth cutting machine, the combination with an upright reciprocating knife having an upright cutting edge and a lower end cutting edge and reciprocating means for reciprocating said knife, of a grinder support, rotary grinding means on said support, means for guiding said support in the direction of length of said knife for grinding coaction between said rotary grinding means and said upright cutting edge, means for limiting downward movement of said support whereby to position said rotary grinding means with their axes of rotation below the upward limit of reciprocating movement of the lower end cutting edge of said reciprocating knife, and means whereby to permit movement of said grinders in the direction of the plane of said knife toward said knife for locating said grinders under said lower end cutting edge for grinding coaction between said rotary grinding means and said lower end cutting edge of said knife.

20. In a cloth cutting machine, the combination with a reciprocating upright knife, of a grinder support, rotary grinding means mounted thereon, an upright shaft extending above said grinder support for rotating said grinding means, constructed and arranged for permitting movement of said grinder support in the direction of length of said knife, a presser-foot, a presser-foot stem telescopingly arranged with relation to said shaft, and means on said grinder support whereby said presser-foot is held to said grinder support in adjacency to said grinder support during movements of said grinder support in the direction of length of said knife.

21. In a cloth cutting machine, the combination with a frame and a reciprocating knife, of a grinder support, grinding means mounted thereon for coaction with said knife, a presser-foot, a presser-foot stem, means for axially guiding said stem with relation to said grinder support, holding means on said grinder support for selectively holding said stem for holding said presser-foot in adjacency to said grinder support and at selective distances therefrom, guiding means for guiding movements of said grinder support substantially parallel with said stem, and manual control means on said frame for said holding means.

22. In a cloth cutting machine, the combination with a frame and a reciprocating knife, of a grinder support, grinding means mounted thereon for coaction with said knife, a presser-foot, a presser-foot stem, means for axially guiding said stem with relation to said grinder support, holding means on said grinder support for selectively holding said stem for holding said presser-foot in adjacency to said grinder support and at selective distances therefrom, guiding means for guiding movements of said grinder support substantially parallel with said stem, manual control means on said frame, and releasable connecting means between said control means and said holding means.

23. In a cloth cutting machine, the combination with a frame and a reciprocating knife, of a grinder support, grinding means mounted thereon for coaction with said knife, a presser-foot, a presser-foot stem, means for axially guiding said stem with relation to said grinder support, holding means on said grinder support for selectively holding said stem for holding said presser-foot in adjacency to said grinder support and at selective distances therefrom, guiding means for guiding movements of said grinder support substantially parallel with said stem, manual control means on said frame for said holding means an releasable connecting means between said control means and said holding means, said holding means comprising automatic means for automatically holding said presser-foot and said grinder support together for combined movements upon release of said releasable connection.

24. In a cloth cutting machine, the combination with a reciprocating knife, of a grinder frame, rotary grinding means thereon, a telescoping shaft extending upwardly from said rotary grinding means in the direction of length of said knife, said telescoping shaft comprising a plurality of sections connected for combined rotative movements, one of said sections connected with said grinder frame for endwise movement therewith, means holding the other of said sections endwise, and guiding means for said grinder frame other than said telescoping shaft and extending in the direction of length of said knife for guiding said grinder frame in said direction.

25. In a cloth cutting machine, the combination with a reciprocating knife and means for reciprocating said knife comprising a rotary element, of a grinder frame, rotary grinding means thereon, a telescoping shaft extending upwardly from said rotary grinding means in the direction of length of said knife, said telescoping shaft comprising a plurality of sections connected for combined rotative movements, one of said sections connected with said grinder frame for movement therewith in the direction of length of said knife, means holding the other of said sections endwise, a rotary drive member for the latter, and means controlling operative connection between said rotary drive member and said rotary element.

26. In a cloth cutting machine, the combination with a reciprocating knife and means for reciprocating said knife comprising a rotary element, of a grinder frame, rotary grinding means thereon, a telescoping shaft extending upwardly from said rotary grinding means in the direction of length of said knife, said telescoping shaft comprising a plurality of sections connected for combined rotative movements, one of said sections connected with said grinder frame for movement therewith in the direction of length of said knife, means holding the other of said sections endwise, a rotary drive member for the latter, resilient means causing driving relation between said rotary drive member and said rotary element, and control means dissociating said driving relation.

27. In a cloth cutting machine, the combination with a reciprocating knife, of a grinder frame, rotary grinding means thereon, a telescoping shaft extending upwardly from said rotary grinding means in the direction of length of said knife, said telescoping shaft comprising a plurality of sections connected for combined rotative movements, one of said sections connected with said grinder frame for endwise movement therewith, a bearing on said grinder frame for said last-named section, a bearing on said grinder frame about and slidable endwise on the other of said sections, a stationary bearing for said other of said sections, and means holding said other of said sections endwise.

28. In a cloth cutting machine, the combination with a reciprocating knife, of a grinder frame, rotary grinding means thereon, a telescoping shaft extending upwardly from said rotary grinding means in the direction of length of said knife, said telescoping shaft comprising a plurality of sections connected for combined rotative movements, one of said sections connected with said grinder frame for endwise movement therewith, a bearing on said grinder frame for said last-named section, a bearing on said grinder frame about and slidable endwise on the other of said sections, a stationary bearing for said other of said sections, means holding said other of said sections endwise, a rotary driving member for said other of said sections, and drive releasing means for the latter.

29. In a cloth cutting machine, the combination with an upright reciprocating knife, of rotary grinders having axes of rotation at substantially right angles to the plane of said knife and end grinding faces presented toward each other at opposite sides of said knife, arms at the respective sides of said knife, pivots at the respective sides of said knife for said arms, means for mounting said respective grinders on said respective arms at different elevations lengthwise of said knife, and means independent of contact with said knife for rotating said grinders.

30. In a cloth cutting machine, the combination with an upright reciprocating knife, of rotary grinders having end grinding faces presented toward each other at opposite sides of said knife, arms at the respective sides of said knife, pivots for said arms substantially parallel with the plane of said knife, said rotary grinders mounted on said arms at different elevations lengthwise of said knife, driven friction wheels on said arms for rotating said rotary grinders; and a drive friction wheel with which said driven friction wheels coact for driving said driven friction wheels, said driven friction wheels movable in arcuate paths crosswise of said drive friction wheel.

31. In a cloth cutting machine, the combination with an upright reciprocating knife, of rotary grinders having end grinding faces presented toward each other at opposite sides of said knife, arms at the respective sides of said knife, pivots for said arms substantially parallel with the plane of said knife, driven friction wheels on said arms for rotating said rotary grinders, a drive friction wheel with which said driven friction wheels coact for driving said rotary grinders, said driven friction wheels movable in arcuate paths crosswise of said drive friction wheel, and resilient means for urging driving contact between said friction wheels.

32. In a cloth cutting machine, the combination with an upright reciprocating knife, of rotary grinders having end friction faces presented toward each other at opposite sides of said knife, arms at the respective sides of said knife, pivots for said arms substantially parallel with the plane of said knife, conical friction wheels on said arms for rotating said rotary grinders, and a conical drive friction wheel with which said conical driven friction wheels coact for driving said rotary grinders, the conical friction faces of said conical driven friction wheels movable in arcuate paths crosswise of and climbingly upon said conical friction face of said conical driven friction wheel for causing approach of said grinding wheels toward said knife in directions crosswise of and parallel with the plane of said knife.

33. In a cloth cutting machine, the combination with an upright reciprocating knife, of rotary grinders having end friction faces presented toward each other at opposite sides of said knife, arms at the respective sides of said knife, pivots for said arms substantially parallel with the plane of said knife, conical friction wheels on said arms for rotating said rotary grinders, a conical drive friction wheel with which said conical driven friction wheels coact for driving said rotary grinders, the conical friction faces of said conical driven friction wheels movable in arcuate paths crosswise of and climbingly upon said conical friction face of said conical drive friction wheel for causing approach of said grinding wheels toward said knife in directions crosswise of and parallel with the plane of said knife and resilient means for urging driving contact between said conical friction faces.

In testimony whereof, I have hereunto signed my name.

ALBERT G. WAGNER.